United States Patent
Bosley et al.

[11] Patent Number: 5,899,673
[45] Date of Patent: May 4, 1999

[54] HELICAL FLOW COMPRESSOR/TURBINE PERMANENT MAGNET MOTOR/GENERATOR

[75] Inventors: Robert W. Bosley, Cerritos; Ronald F. Miller, Marina del Rey; Joel B. Wacknov, Monrovia, all of Calif.

[73] Assignee: Capstone Turbine Corporation, Tarzana, Calif.

[21] Appl. No.: 08/730,946

[22] Filed: Oct. 16, 1996

[51] Int. Cl.⁶ .................................................. F04B 35/04
[52] U.S. Cl. .................. 417/423.14; 417/423.1; 417/423.7; 415/55.1; 415/55.2
[58] Field of Search .............................. 417/423.1, 423.7, 417/423.12, 423.14; 415/55.1, 55.2

[56] References Cited

U.S. PATENT DOCUMENTS

| | | |
|---|---|---|
| 1,665,687 | 4/1928 | Derrick . |
| 1,973,669 | 9/1934 | Spoor . |
| 2,220,538 | 11/1940 | Neibert . |
| 2,245,094 | 6/1941 | Neibert . |
| 2,247,335 | 6/1941 | Neibert . |
| 2,319,776 | 5/1943 | Copeland et al. . |
| 2,364,168 | 12/1944 | Shallenberg ................ 417/423.1 |
| 2,724,338 | 11/1955 | Roth ................................ 415/55.2 |
| 2,785,634 | 3/1957 | Marshall et al. . |
| 2,842,062 | 7/1958 | Wright . |
| 3,581,493 | 6/1971 | Sweet et al. . |
| 3,722,218 | 3/1973 | Lapera . |
| 3,782,850 | 1/1974 | Egli et al. . |
| 3,973,865 | 8/1976 | Mugle ............................. 415/55.1 |
| 4,197,051 | 4/1980 | Egli et al. . |
| 4,248,567 | 2/1981 | Egli et al. . |
| 4,261,685 | 4/1981 | Egli et al. . |
| 4,279,570 | 7/1981 | Egli et al. . |
| 4,281,511 | 8/1981 | Neale . |
| 4,306,833 | 12/1981 | Sixsmith et al. . |
| 4,325,672 | 4/1982 | Sixsmith et al. . |
| 4,408,952 | 10/1983 | Schweinfurter . |
| 4,466,781 | 8/1984 | Kemmner et al. . |
| 4,653,979 | 3/1987 | Schillinger . |
| 4,869,642 | 9/1989 | Williamson et al. . |
| 4,901,520 | 2/1990 | Kozak et al. . |
| 4,923,364 | 5/1990 | Nilsen et al. . |
| 4,948,344 | 8/1990 | Cygnor . |
| 5,009,575 | 4/1991 | Hanai et al. . |
| 5,011,369 | 4/1991 | Mine et al. . |
| 5,160,249 | 11/1992 | Iwai et al. . |
| 5,163,810 | 11/1992 | Smith . |
| 5,185,997 | 2/1993 | Nishijima . |
| 5,215,429 | 6/1993 | Sun . |
| 5,273,394 | 12/1993 | Samuel . |
| 5,281,083 | 1/1994 | Ito et al. . |
| 5,310,308 | 5/1994 | Yu et al. . |
| 5,356,272 | 10/1994 | Nagata et al. ................. 417/423.7 |
| 5,449,269 | 9/1995 | Frank et al. . |
| 5,456,574 | 10/1995 | Donnelly et al. . |
| 5,468,119 | 11/1995 | Huebel et al. . |
| 5,486,087 | 1/1996 | Treiber et al. ................... 415/55.2 |
| 5,498,124 | 3/1996 | Ito et al. ......................... 415/55.1 |
| 5,513,950 | 5/1996 | Yu .................................. 415/55.1 |

*Primary Examiner*—Charles G. Freay
*Attorney, Agent, or Firm*—Albert J. Miller

[57] ABSTRACT

A helical flow compressor/turbine or pump/turbine with integral permanent magnet motor/generator is disclosed which can be configured as a single stage, two stage or three stage rotary machine. The impeller blades for this machine can be either radial for ease of manufacture or curved, with the curve at the leading edge being greater than at the blade root, for maximum fluid dynamic head pressure and maximum efficiency. Tapered flow channels are utilized to maximize fluid-dynamic efficiency. The helical flow machine disclosed produces precisely controlled pressure changes and energy changes in the process fluid passing through the machine and provides information on fluid flow rates.

25 Claims, 11 Drawing Sheets

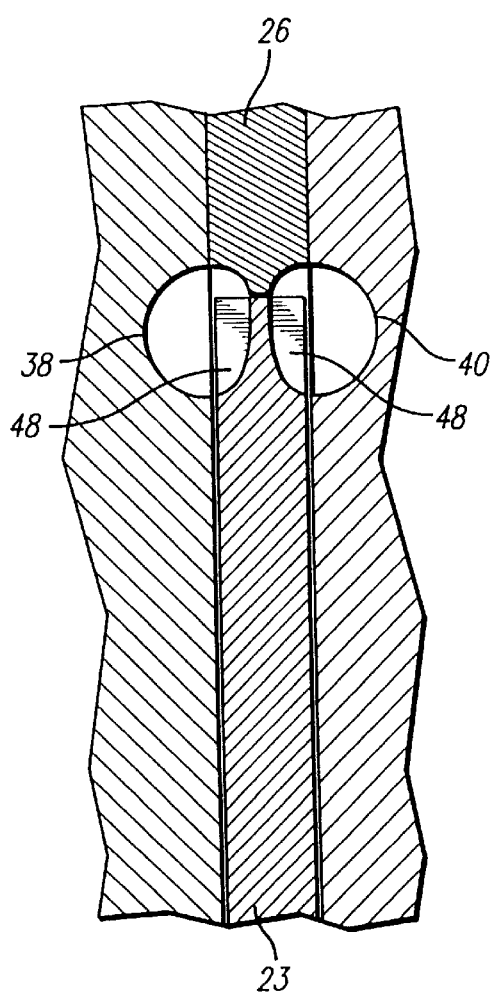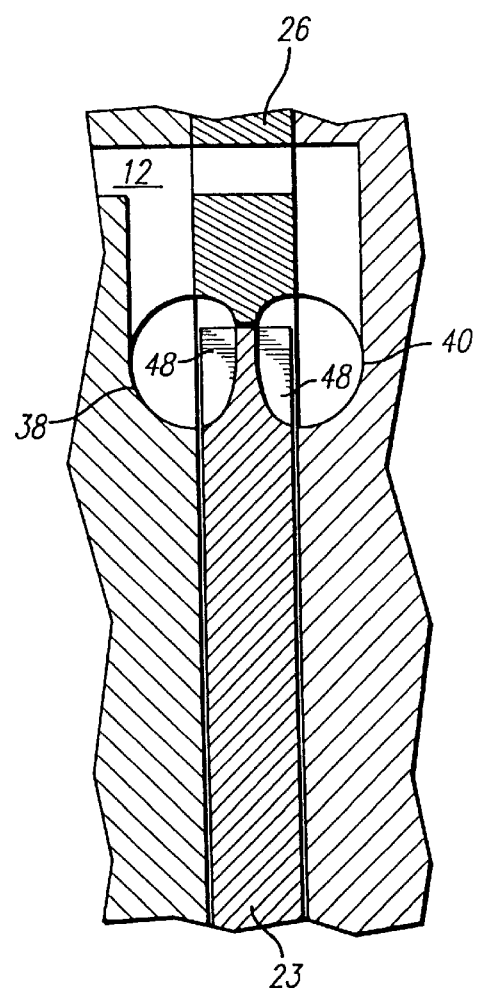

HELICAL FLOW COMPRESSOR/TURBINE PERMANENT MAGNET MOTOR/ GENERATOR

TECHNICAL FIELD

This invention relates to the general field of helical flow compressors and turbines and more particularly to an improved helical flow compressor/turbine integrated with a permanent magnet motor/generator.

BACKGROUND OF THE INVENTION

A helical flow compressor is a high-speed rotary machine that accomplishes compression by imparting a velocity head to each fluid particle as it passes through the machine's impeller blades and then converting that velocity head into a pressure head in a stator channel that functions as a vaneless diffuser. While in this respect a helical flow compressor has some characteristics in common with a centrifugal compressor, the primary flow in a helical flow compressor is peripheral and asymmetrical, while in a centrifugal compressor, the primary flow is radial and symmetrical. The fluid particles passing through a helical flow compressor travel around the periphery of the helical flow compressor impeller within a generally horseshoe shaped stator channel. Within this channel, the fluid particles travel along helical streamlines, the centerline of the helix coinciding with the center of the curved stator channel. This flow pattern causes each fluid particle to pass through the impeller blades or buckets many times while the fluid particles are traveling through the helical flow compressor, each time acquiring kinetic energy. After each pass through the impeller blades, the fluid particles reenter the adjacent stator channel where they convert their kinetic energy into potential energy and a resulting peripheral pressure gradient in the stator channel.

The multiple passes through the impeller blades (regenerative flow pattern) allows a helical flow compressor to produce discharge heads of up to fifteen (15) times those produced by a centrifugal compressor operating at equal tip speeds. Since the cross-sectional area of the peripheral flow in a helical flow compressor is usually smaller than the cross-sectional area of the radial flow in a centrigal compressor, a helical flow compressor would normally operate at flows which are lower than the flows of a centrifugal compressor having an equal impeller diameter and operating at an equal tip speed. These high-head, low-flow performance characteristics of a helical flow compressor make it well suited to a number of applications where a reciprocating compressor, a rotary displacement compressor, or a low specific-speed centrifugal compressor would not be as well suited.

A helical flow compressor can be utilized as a turbine by supplying it with a high pressure working fluid, dropping fluid pressure through the machine, and extracting the resulting shaft horsepower with a generator. Hence the term "compressor/turbine" which is used throughout this application.

Among the advantages of a helical flow compressor or a helical flow turbine are:

(a) simple, reliable design with only one rotating assembly;
(b) stable, surge-free operation over a wide range of operating conditions (i.e. from full flow to no flow);
(c) long life (e.g., 40,000 hours) limited mainly by their bearings;
(d) freedom from wear product and oil contamination since there are no rubbing or lubricated surfaces utilized;
(e) fewer stages required when compared to a centrifugal compressor; and
(f) higher operating efficiencies when compared to a very low specific-speed (high head pressure, low impeller speed, low flow) centrifugal compressor.

On the other hand, a helical flow compressor or turbine cannot compete with a moderate to high specific-speed centrifugal compressor, in view of their relative efficiencies. While the best efficiency of a centrifugal compressor at a high specific-speed operating condition would be on the order of seventy-eight percent (78%), at a low specific-speed operating condition a centrifugal compressor could have an efficiency of less than twenty percent (20%). A helical flow compressor operating at the same low specific-speed and at its best flow can have efficiencies of about fifty-five percent (55%) with curved blades and can have efficiencies of about thirty-eight percent (38%) with straight radial blades.

The flow in a helical flow compressor can be visualized as two fluid streams which first merge and then divide as they pass through the compressor. One fluid stream travels within the impeller buckets and endlessly circles the compressor. The second fluid stream enters the compressor radially through the inlet port and then moves into the horseshoe shaped stator channel which is adjacent to the impeller buckets. Here the fluids in the two streams merge and mix. The stator channel and impeller bucket streams continue to exchange fluid while the stator channel fluid stream is drawn around the compressor by the impeller motion. When the stator channel fluid stream has traveled around most of the compressor periphery, its further circular travel is blocked by the stripper plate. The stator channel fluid stream then turns radially outward and exits from the compressor through the discharge port. The remaining impeller bucket fluid stream passes through the stripper plate within the buckets and merges with the fluid just entering the compressor/turbine.

The fluid in the impeller buckets of a helical flow compressor travels around the compressor at a peripheral velocity which is essentially equal to the impeller blade velocity. It thus experiences a strong centrifugal force which tends to drive it radially outward, out of the buckets. The fluid in the adjacent stator channel travels at an average peripheral velocity of between five (5) and ninety-nine (99) percent of the impeller blade velocity, depending upon the compressor discharge flow. It thus experiences a centrifugal force which is much less than that experienced by the fluid in the impeller buckets. Since these two centrifugal forces oppose each other and are unequal, the fluid occupying the impeller buckets and the stator channel is driven into a circulating or regenerative flow. The fluid in the impeller buckets is driven radially outward and "upward" into the stator channel. The fluid in the stator channel is displaced and forced radially inward and "downward" into the impeller bucket.

The fluid in the impeller buckets of a helical flow turbine travels around the turbine at a peripheral velocity which is essentially equal to the impeller blade velocity. It thus experiences a strong centrifugal force which would like to drive it radially outward if unopposed by other forces. The fluid in the adjacent stator channel travels at an average peripheral velocity of between one hundred and one percent (101%) and two hundred percent (200%) of the impeller blade velocity, depending upon the compressor discharge flow. It thus experiences a centrifugal force which is much greater than that experienced by the fluid in the impeller buckets. Since these two centrifugal forces oppose each other and are unequal, the fluid occupying the impeller buckets and the stator channel is driven into a circulating or regenerative flow. The fluid in the impeller buckets is driven radially inward and "upward" into the stator channel. The fluid in the stator channel is displaced and forced radially outward and "downward" into the impeller bucket.

While the fluid is traveling regeneratively, it is also traveling peripherally around the stator-impeller channel. Thus, each fluid particle passing through a helical flow compressor or turbine travels along a helical streamline, the centerline of the helix coinciding with the center of the generally horseshoe shaped stator-impeller channel.

While the unique capabilities of a helical flow compressor would seem to offer many applications, the low flow limitation has severely curtailed their widespread utilization.

Permanent magnet motors and generators, on the other hand, are used widely in many varied applications. This type of motor/generator has a stationary field coil and a rotatable armature of permanent magnets. In recent years, high energy product permanent magnets having significant energy increases have become available. Samarium cobalt permanent magnets having an energy product of twenty-seven (27) megagauss-oersted (mgo) are now readily available and neodymium-iron-boron magnets with an energy product of thirty-five (35) megagauss-oersted are also available. Even further increases of mgo to over 45 megagauss-oersted promise to be available soon The use of such high energy product permanent magnets permits increasingly smaller machines capable of supplying increasingly higher power outputs. The permanent magnet rotor may comprise a plurality of equally spaced magnetic poles of alternating polarity or may even be a sintered one-piece magnet with radial orientation. The stator would normally include a plurality of windings and magnet poles of alternating polarity. In a generator mode, rotation of the rotor causes the permanent magnets to pass by the stator poles and coils and thereby induces an electric current to flow in each of the coils. In the motor mode, electrical current is passed through the coils which will cause the permanent magnet rotor to rotate.

SUMMARY OF THE INVENTION

In the present invention, a helical flow compressor/turbine is integrated with a permanent magnet motor/generator to obtain fluid dynamic control characteristics that are otherwise not readily obtainable. The helical flow compressor permanent magnet motor/generator includes a housing having a wound stator positioned at one end thereof around a permanent magnet rotor disposed on a shaft rotatably supported within said housing between a pair of bearings. A helical flow compressor impeller having at least one row of a plurality of blades is mounted at the other end of the shaft within a compressor housing. The compressor housing includes a generally horseshoe shaped fluid flow stator channel operably associated with each row of the plurality of impeller blades, a fluid inlet at one end of the generally horseshoe shaped fluid flow stator channel(s), and a fluid outlet at the other end of the generally horseshoe shaped fluid flow stator channel(s).

The impeller blades can be either straight radial blades or curved with generally radial blade tips and the impeller can have a single row of blades or two (2) rows of blades. Multiple impellers can be utilized to provide multiple stages of compression.

It is therefore, a principal object of the present invention to provide an improved helical flow compressor/turbine permanent magnet motor/generator.

It is another object of the present invention to provide a helical flow compressor/turbine and permanent magnet motor/generator integrated on a common shaft.

It is another object of the present invention to provide a helical flow compressor/turbine having an impeller or impellers supported on the shaft of a permanent magnet motor/generator.

It is another object of the present invention to provide an improved helical flow pump/turbine permanent magnet motor/generator.

It is another object of the present invention to provide a helical flow pump/turbine and permanent magnet motor/generator integrated on a common shaft.

It is another object of the present invention to provide a helical flow pump/turbine having an impeller or impellers supported on the shaft of a permanent magnet motor/generator.

It is another objective of the present invention to provide an improved means of compressing and/or expanding gaseous fluids utilizing a helical flow compressor/turbine with an integral permanent magnet motor/generator (rotary machine) and a four quadrant inverter.

It is another objective of the present invention to provide an improved means of pressurizing and/or depressurizing incompressible fluids utilizing a helical flow pump/turbine with an integral permanent magnet motor/generator (rotary machine) and a four quadrant inverter.

It is another objective of the present invention to provide a helical flow compressor/turbine permanent magnet motor/generator and/or a helical flow pump/turbine permanent magnet motor/generator that can generate electrical power from the working fluid when the fluid pressure supplied to the inlet of the rotary machine is greater than the fluid pressure needed at the outlet of the rotary machine.

It is another objective of the present invention to provide a helical flow compressor/turbine permanent magnet motor/generator and/or a helical flow pump/turbine permanent magnet motor/generator that can utilize electrical power to compress or pressurize the working fluid when the fluid pressure needed at the outlet of the rotary machine is greater than the fluid pressure supplied at the inlet of the rotary machine.

It is another objective of the present invention to provide a helical flow compressor/turbine permanent magnet motor/generator and/or a helical flow pump/turbine permanent magnet motor/generator that can shift or transition smoothly from generating electrical power while expanding or depressurizing the working fluid to utilizing electrical power to compress or pressurize the working fluid in response to changes in the supplied inlet fluid pressure and/or the required outlet fluid pressure.

It is another objective of the present invention to provide a helical flow compressor/turbine permanent magnet motor/generator and/or a helical flow pump/turbine permanent magnet motor/generator and associated inverter that can precisely control the shaft speed of the rotary machine.

It is another objective of the present invention to provide a helical flow compressor/turbine permanent magnet motor/generator and/or a helical flow pump/turbine permanent magnet motor/generator and associated inverter that can precisely control the shaft torque of the rotary machine.

It is another objective of the present invention to provide a helical flow compressor/turbine permanent magnet motor/generator and/or a helical flow pump/turbine permanent magnet motor/generator that can precisely control the fluid pressure change that occurs as the working fluid passes through the rotary machine (e.g. by controlling shaft torque).

It is another objective of the present invention to provide a helical flow compressor/turbine permanent magnet motor/ generator and/or a helical flow pump/turbine permanent magnet motor/generator that can precisely control the fluid energy change that occurs as the working fluid passes through the rotary machine (e.g. by controlling the product of shaft speed and torque).

It is another objective of the present invention to provide a helical flow compressor/turbine permanent magnet motor/generator and/or a helical flow pump/turbine permanent magnet motor/generator that can provide volumetric flow rate data for the process fluid passing through the rotary machine (e.g. by monitoring shaft speed and torque).

It is another objective of the present invention to provide a compressor/turbine and/or a pump/turbine that does not experience fluid dynamic stall or surge instabilities such as are experienced by centrifugal compressors/pumps/turbines when process fluid flows are low and pressure changes through these rotary machines are large.

It is another objective of the present invention to provide a compressor/turbine and/or a pump/turbine that does not produce fluid pressure pulsations or flow pulsations such as those produced by reciprocating compressors.

It is another objective of the present invention to provide a compressor/turbine and/or a pump/turbine that does not need to be turned on and off in order to control fluid discharge pressure such as can be the case with reciprocating compressors driven by constant speed motors when fluid delivery flow rates must vary.

It is another objective of the present invention to provide a compressor/turbine and/or a pump/turbine that does not need accumulator tanks in order to limit fluid discharge pressure pulsations (e.g. caused by compressor/pump piston strokes) and to limit fluid discharge pressure variations (e.g. caused by variations in the required process fluid delivery flow and by turning the compressor/pump/turbine on and off).

It is another objective of the present invention to provide a compressor/turbine and/or a pump/turbine that has no rubbing rings, seal or other hardware that can wear.

It is another objective of the present invention to provide a compressor/turbine and/or a pump/turbine that does not utilize oil lubrication and does not discharge oil vapors with the process fluids.

It is another objective of the present invention to provide a rotary machine compressor/turbine and/or a pump/turbine that produces a large pressure change in the process fluid with low rotor tip speeds.

It is another objective of the present invention to provide a rotary machine compressor/turbine and/or a pump/turbine that operates at reasonably high efficiencies when machine specific speed is low (i.e. when pressure change is high, tip speed is low and flow rate). (This is a condition where centrifugal compressors perform poorly).

It is another objective of the present invention to provide a helical flow compressor/turbine permanent magnet motor/generator and/or a helical flow pump/turbine permanent magnet motor/generator and associated inverter that are efficient in fluid dynamic energy conversions and efficient in electrical power generation and utilization over the entire operating ranges for pressure, flow and speed.

It is another objective of the present invention to provide a compressor/turbine and/or a pump/turbine that can operate from no flow with maximum pressure change across the rotary machine to fill flow with minimum pressure change across the rotary machine with no instabilities or discontinuities in the pressure/flow characteristics.

It is another objective of the present invention to provide a compressor/turbine and/or a pump/turbine, motor/generator, and inverter that can quickly and continuously adjust its process fluid throughput flow rate to match requirements.

It is another objective of the present invention to provide a helical flow compressor/turbine permanent magnet motor/generator and/or a helical flow pump/turbine permanent magnet motor/generator that can be configured as a single stage, a two stage, or a three stage rotary machine with all impeller wheels and the motor rotor mounted on a common shaft.

It is another objective of the present invention to provide a multi-stage helical flow compressor/turbine and/or a helical flow pump/turbine with interstage fluid flow passages that are internal to the rotary machine and which have minimal pressure losses.

It is another objective of the present invention to provide a single two stage helical flow compressor/turbine and/or a helical flow pump/turbine with conductive cooling paths from the stator channels directly to the convectively cooled outer surfaces of the rotary machine.

It is another objective of the present invention to provide a helical flow compressor/turbine and/or a helical flow pump/turbine utilizing straight radial blades that are easy to manufacture.

It is another objective of the present invention to provide a helical flow compressor/turbine and/or a helical flow pump/turbine utilizing curved blades that: 1) minimize regenerative flow entry losses at the roots of the blades, 2) provide enhanced regenerative flow drive, 3) increase pressure head change per stage for a given tip speed and non-dimensional flow, 4) increase machine operating efficiency when compared to radial bladed machines.

It is another objective of the present invention to provide a helical flow compressor/turbine utilizing tapered stator channels having cross-sectional flow areas that vary along the peripheral flow path to compensate for density changes in the working fluid.

It is another objective of the present invention to provide a helical flow compressor/turbine and/or a helical flow pump/turbine utilizing a converging nozzle passage at the entry to each stator channel to efficiently convert fluid pressure energy into fluid velocity energy.

It is another objective of the present invention to provide a helical flow compressor/turbine and/or a helical flow pump/turbine utilizing a diverging diffuser passage at the exit from each stator channel to efficiently convert fluid velocity energy into fluid pressure energy.

It is another objective of the present invention to provide a helical flow compressor/turbine and/or a helical flow pump/turbine utilizing a stripper plate to split the inlet flow entering each stator channel into two flow paths, one above and one below the impeller wheel. This initiates the regenerative/helical fluid flow pattern. Note that the flow out of each stator channel is not split by the stripper plate.

BRIEF DESCRIPTION OF THE DRAWINGS

Figure 1:
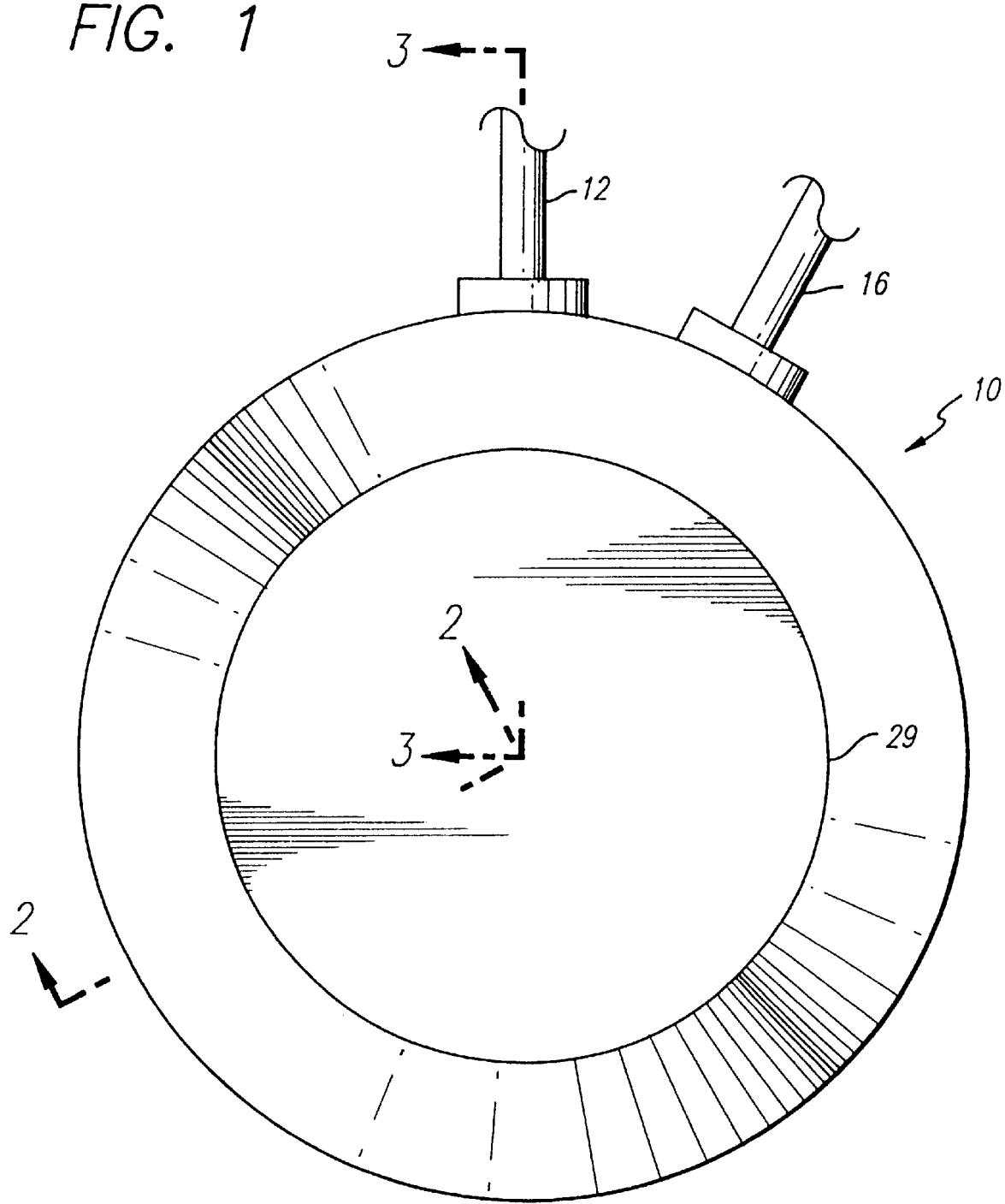
Figure 2:
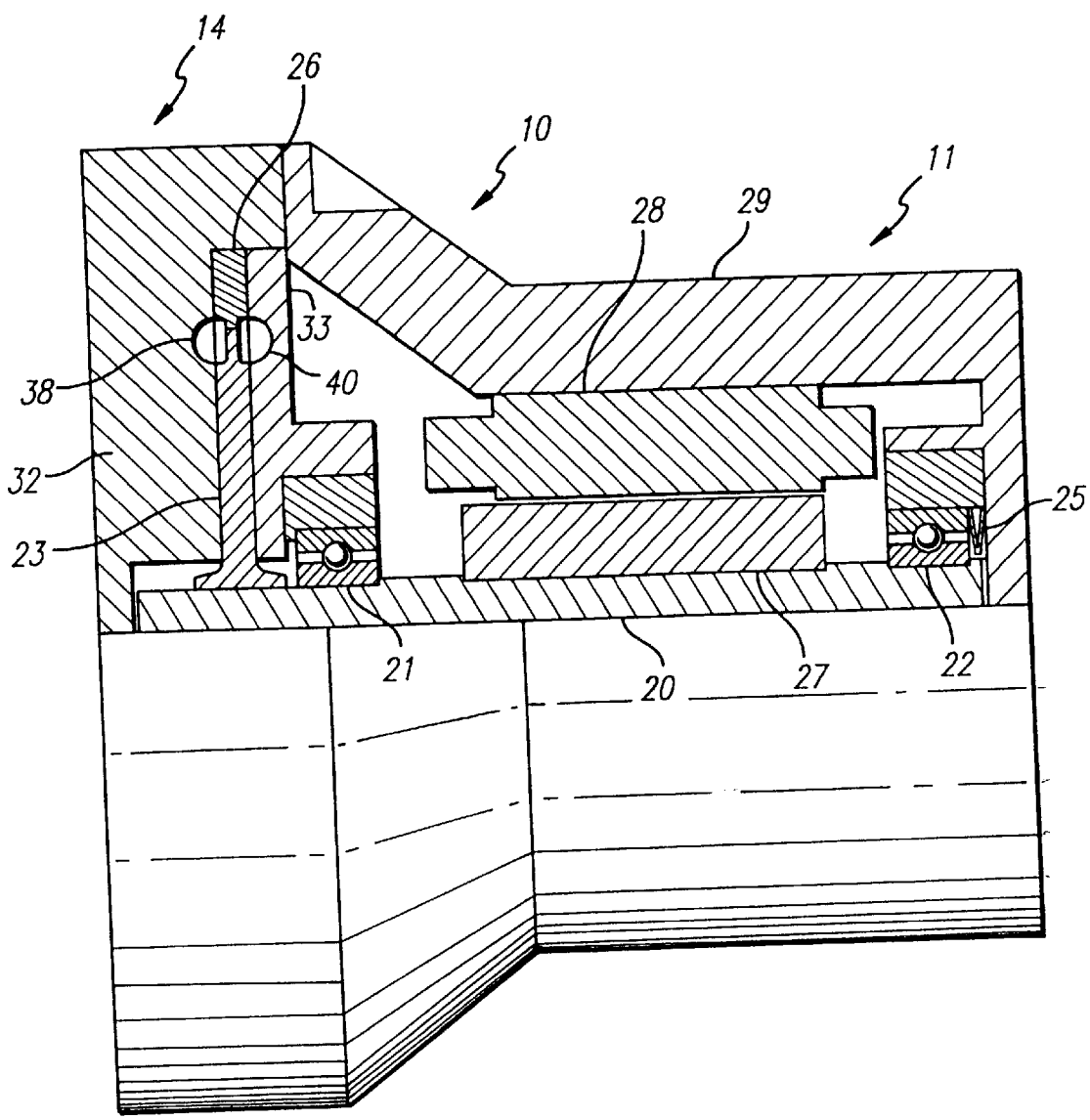
Figure 3:
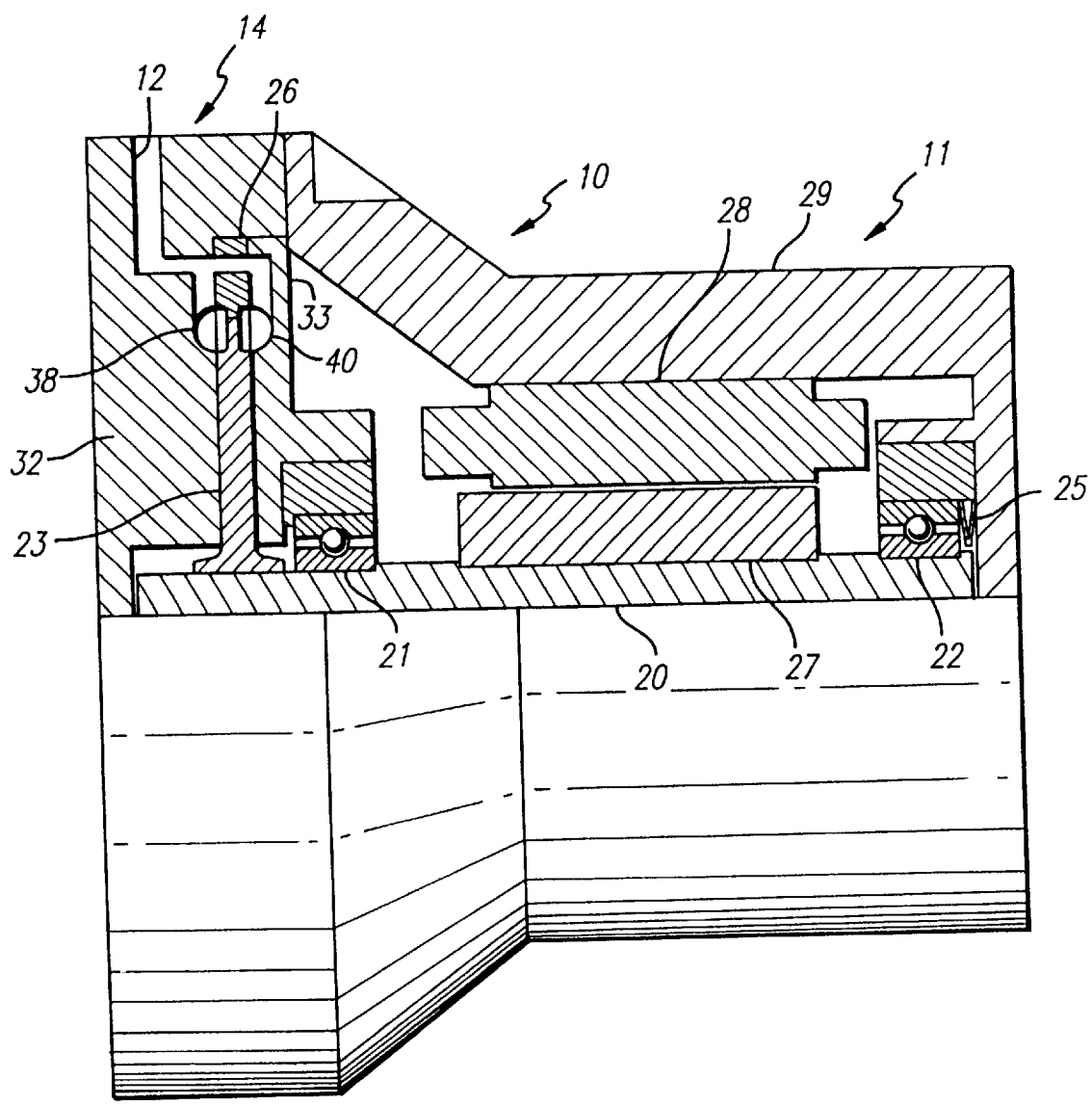
Figure 6:
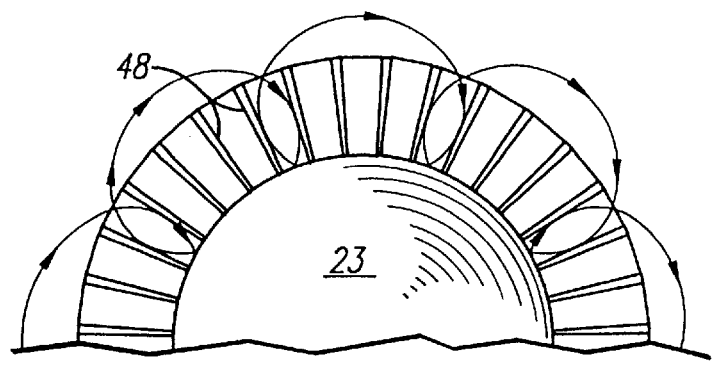
Figure 7:
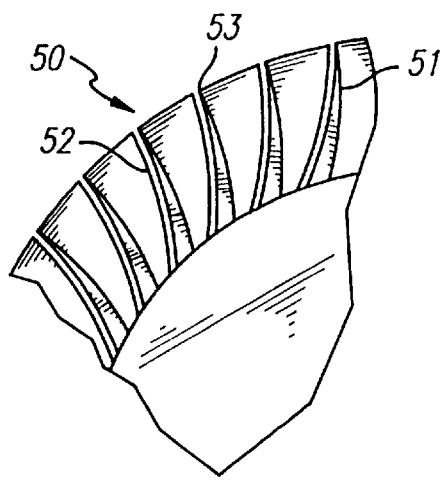
Figure 8:
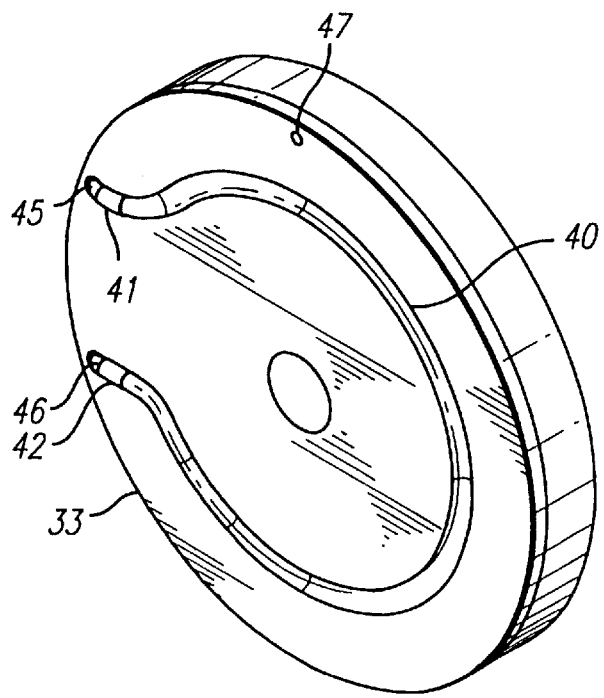
Figure 9:
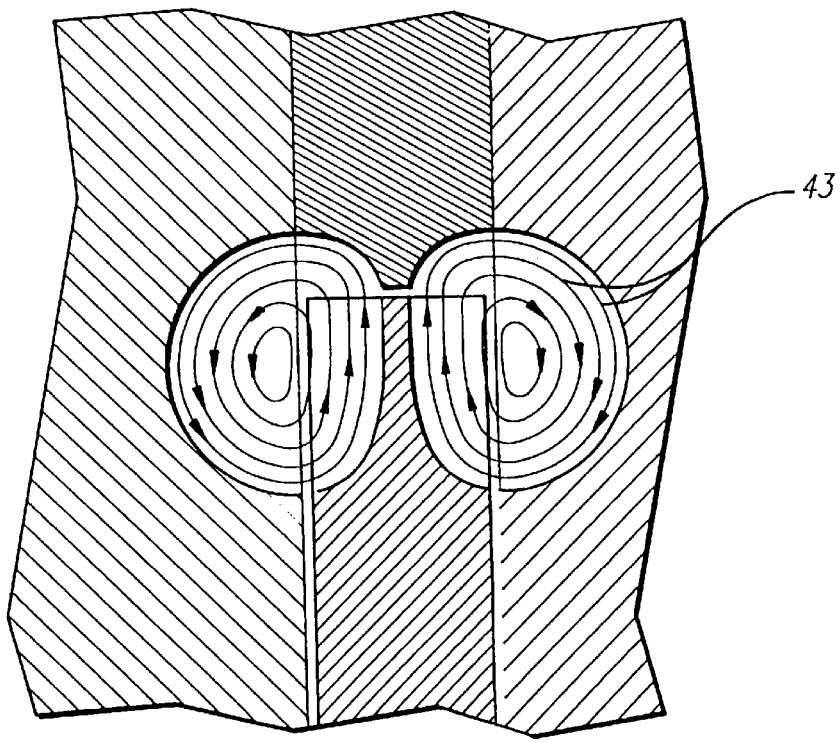
Figure 10:
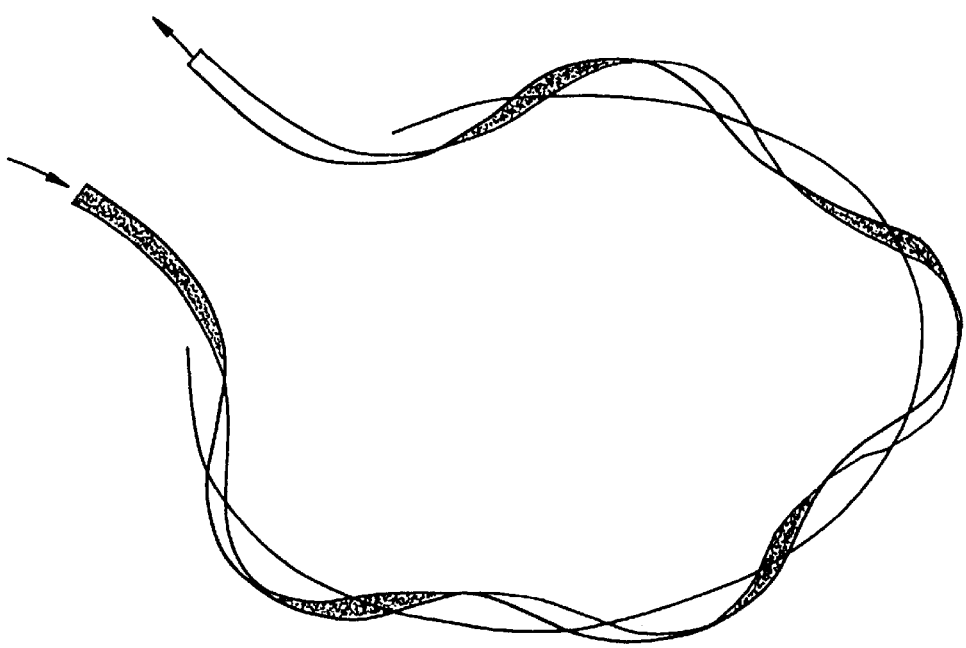
Figure 11:
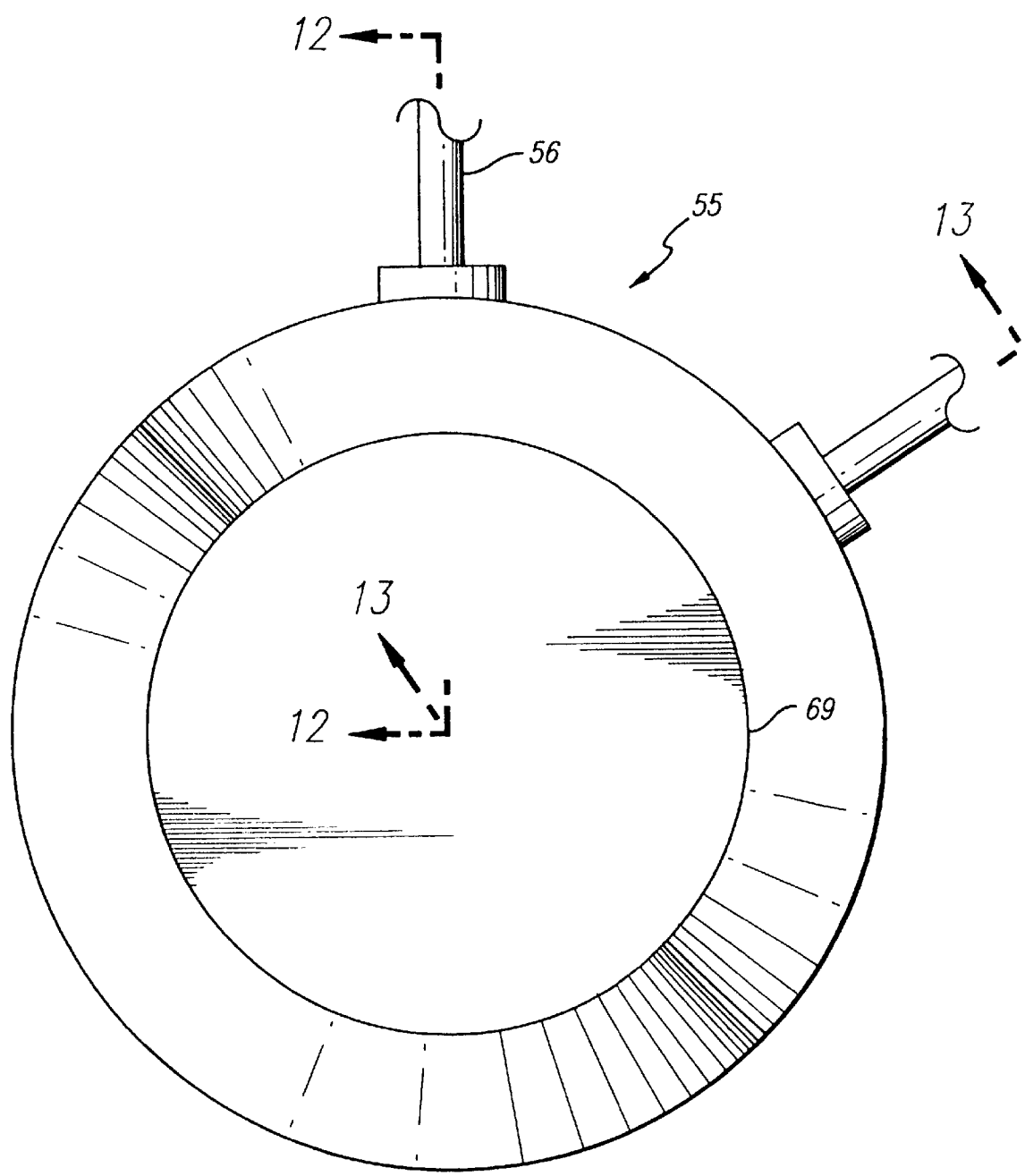
Figure 12:
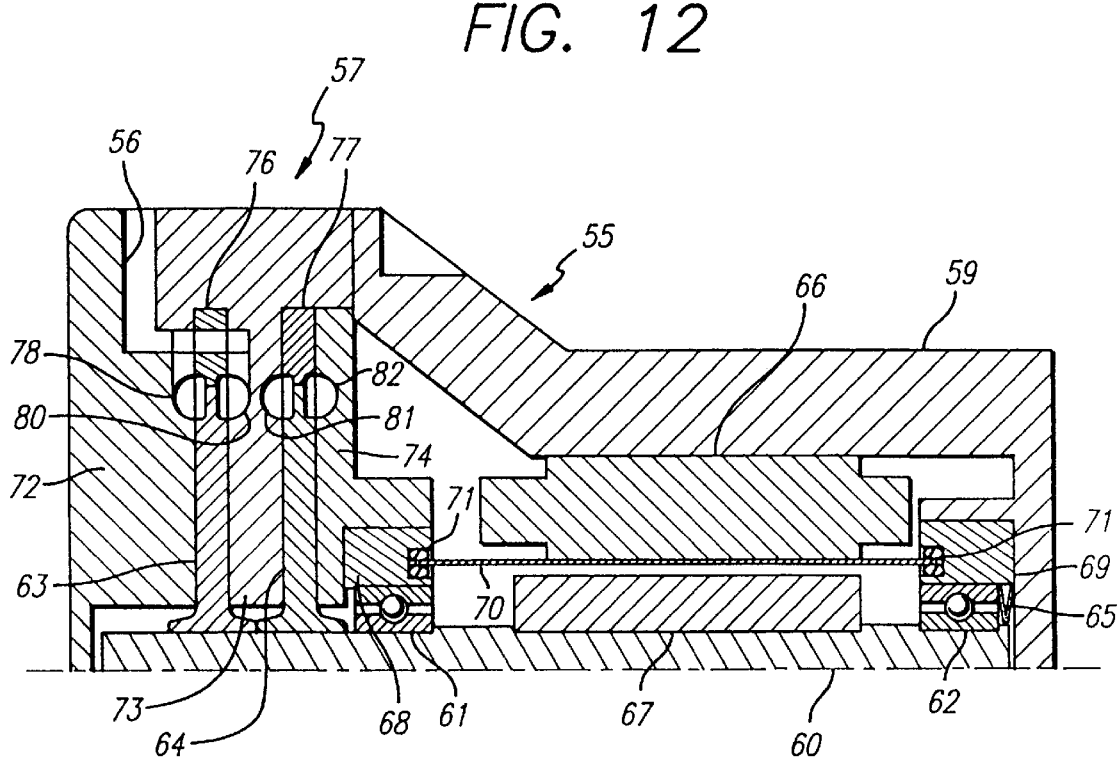
Figure 13:
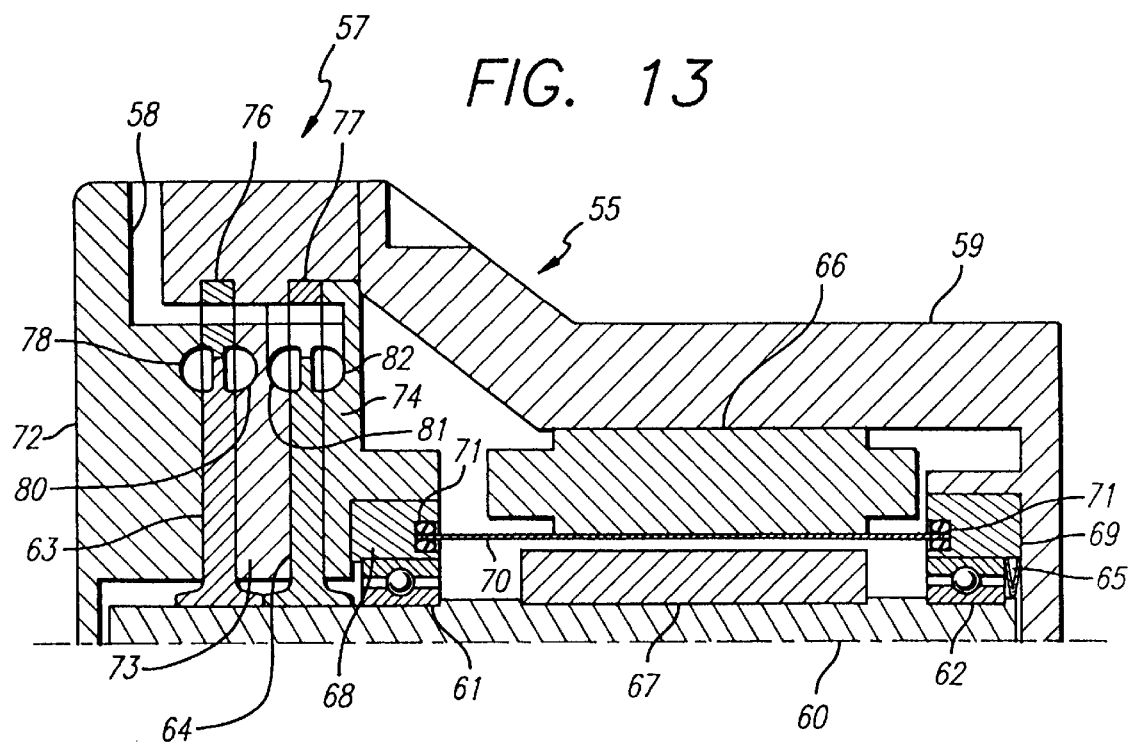
Figure 14:
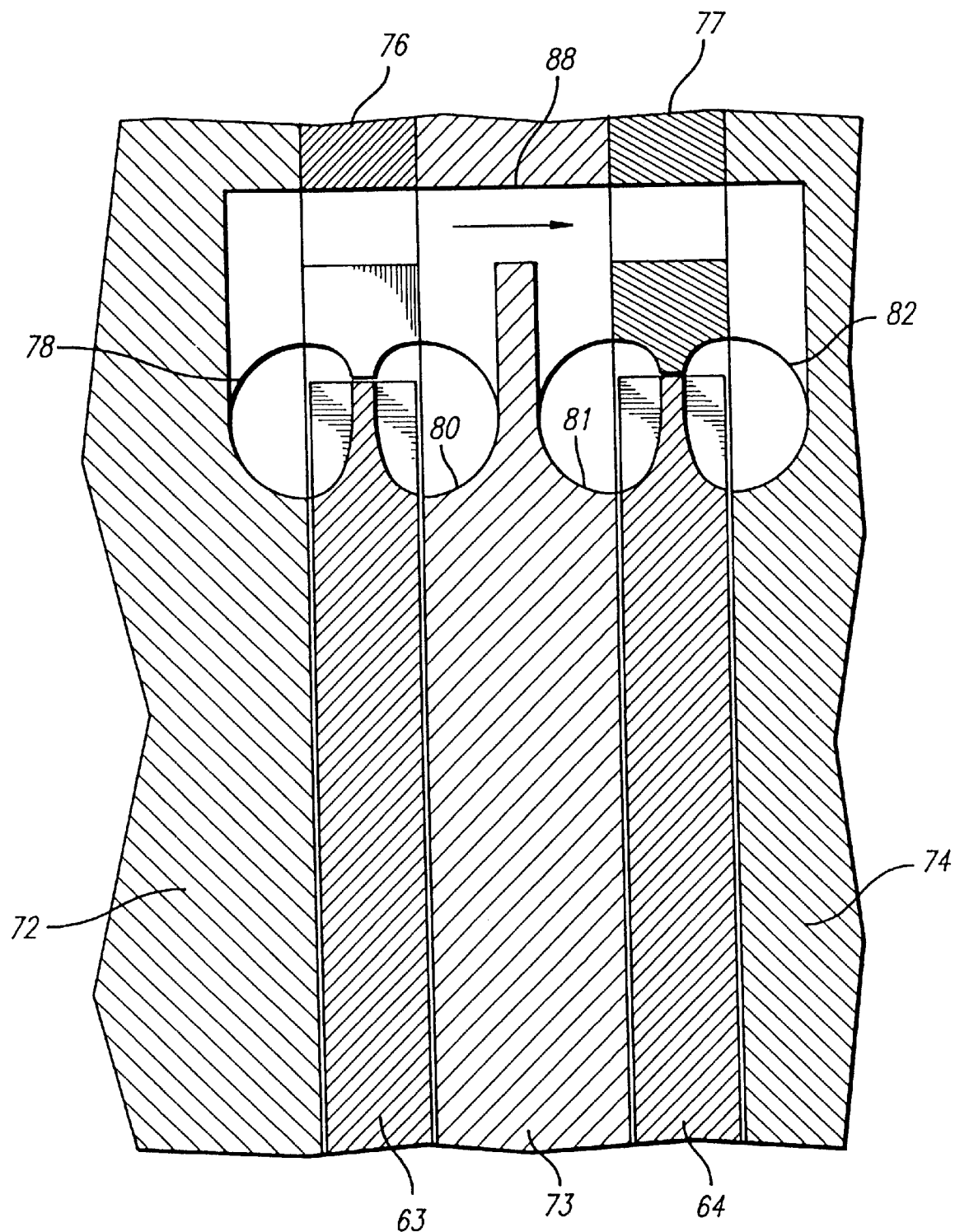
Figure 15:
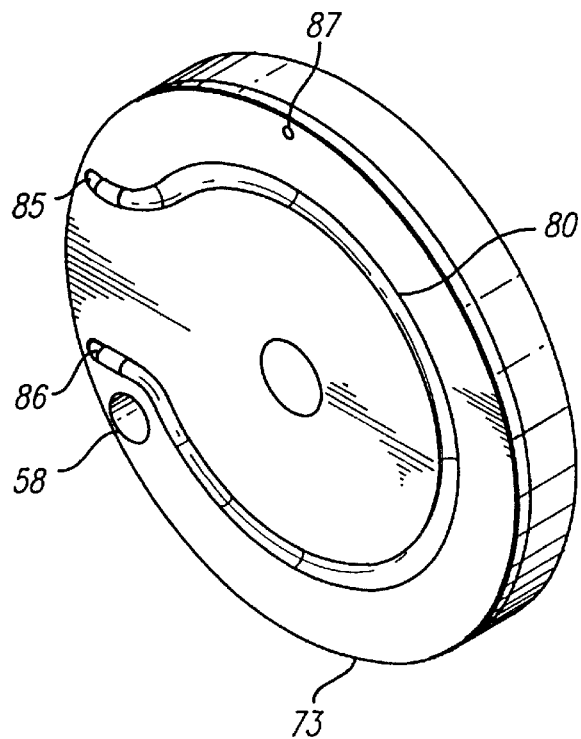
Figure 16:
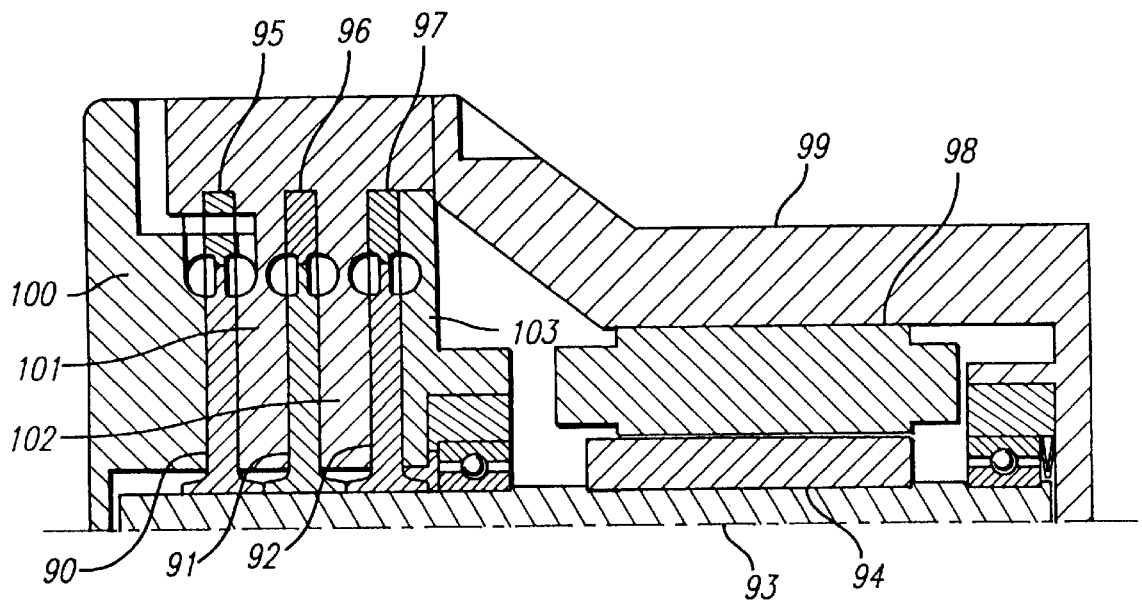
Figure 17:
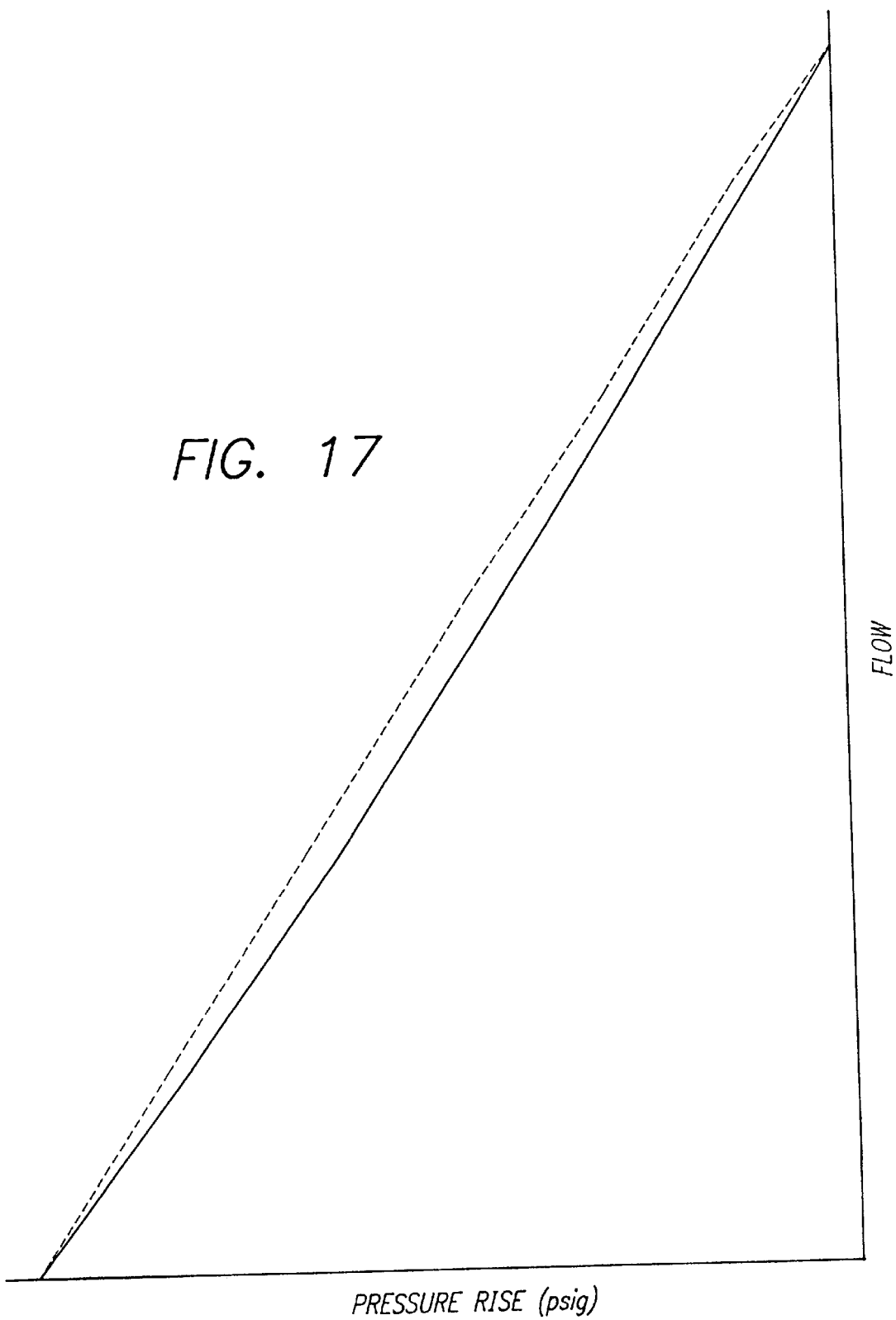

Having thus described the present invention in general terms, reference will now be made to the accompanying drawings in which:

FIG. 1 is an end view of a single stage helical flow compressor/turbine permanent magnet motor/generator of the present invention;

FIG. 2 is a cross sectional view of the helical flow compressor/turbine permanent magnet motor/generator of FIG. 1 taken along line 2—2;

FIG. 3 is a cross sectional view of the helical flow compressor/turbine permanent magnet motor/generator of FIG. 1 taken along line 3—3;

FIG. 4 is an enlarged sectional view of a portion of the helical flow compressor/turbine permanent magnet motor/generator of FIG. 2;

FIG. 5 is an enlarged sectional view of a portion of the helical flow compressor/turbine permanent magnet motor/generator of FIG. 3;

FIG. 6 is an enlarged partial plan view of the helical flow compressor/turbine impeller having straight radial blades and illustrating the flow of fluid therethrough;

FIG. 7 is an enlarged partial plan view of a helical flow compressor/turbine impeller having curved blades;

FIG. 8 is an exploded perspective view of a stator channel plate of the helical flow compressor/turbine permanent magnet motor/generator of FIGS. 1–5;

FIG. 9 is an enlarged sectional view of a portion of FIG. 4 illustrating fluid flow streamlines in the impeller blades and fluid flow stator channels;

FIG. 10 is a schematic representation of the flow of fluid through a helical flow compressor/turbine;

FIG. 11 is an end view of a two stage helical flow compressor/turbine permanent magnet motor/generator of the present invention;

FIG. 12 is a cross sectional view of the helical flow compressor/turbine permanent magnet motor/generator of FIG. 11 taken along line 12—12;

FIG. 13 is a cross sectional view of the helical flow compressor/turbine permanent magnet motor/generator of FIG. 11 taken along line 13—13;

FIG. 14 is an enlarged sectional view of the helical flow compressor/turbine permanent magnet motor/generator of FIGS. 11–13 illustrating the crossover of fluid from the low pressure stage to the high pressure stage;

FIG. 15 is an exploded perspective view of the mid stator channel plate of the helical flow compressor/turbine of the helical flow compressor/turbine permanent magnet motor/generator of FIGS. 11–13;

FIG. 16 is a sectional view of a three stage helical flow compressor/turbine permanent magnet motor/generator of the present invention; and FIG. 17 is a graph of the pressure versus flow characteristics of a helical flow compressor.

DETAILED DESCRIPTION OF THE PREFERRED EMBODIMENTS

A single stage helical flow compressor/turbine permanent magnet motor/generator 10 is illustrated in FIGS. 1–3 and includes a fluid inlet 12 to provide fluid to the helical flow compressor/turbine 14 of the helical flow compressor/turbine permanent magnet motor/generator 10 and a fluid outlet 16 to remove fluid from the helical flow compressor/turbine 14 of the helical flow compressor/turbine permanent magnet motor/generator 10. The helical flow machine is referred to as a compressor/turbine since it can function both as a compressor and as a turbine. The permanent magnet machine is referred to as a motor/generator since it can function equally well as a motor to produce shaft horsepower or as a generator to produce electrical power.

The helical flow compressor/turbine permanent magnet motor/generator 10 includes a shaft 20 rotatably supported by bearings 21 and 22. The position of bearing 22 is maintained by two back-to-back Belleville type washers 25 which also prevent rotation of the outer bearing race. An impeller 23 is mounted at one end of the shaft 20, while permanent magnet rotor 27 is mounted at the opposite end thereof between bearings 21 and 22.

A stripper plate 26 is disposed radially outward from impeller 23. The permanent magnet rotor 27 on the shaft 20 is disposed to rotate within stator 28 having electrical conductors which is disposed in the permanent magnet housing 29.

The impeller 23 is disposed to rotate between stator channel plate 32 and stator channel plate 33. The stripper plate 26 has a thickness slightly greater than the thickness of impeller 23 to provide a running clearance for the impeller 23 between stator channel plates 32 and 33. Stator channel plate 32 includes a generally horseshoe shaped fluid flow stator channel 38 having an inlet to receive fluid from the fluid inlet 12. Stator channel plate 33 also includes a generally horseshoe shaped fluid flow stator channel 40 which mirrors the generally horseshoe shaped fluid flow stator channel 38 in the stator channel plate 32.

Each of the stator channels 38 and 40 include an inlet 45 and an outlet 46 disposed radially outward from the channel. The inlets and outlets of generally horseshoe shaped fluid flow stator channel 38 and generally horseshoe shaped fluid flow stator channel 40 are aligned. The fluid inlet 12 extends through stator channel plate 32 and stripper plate 26 to the inlets 45 of both of stator channel plate generally horseshoe shaped fluid flow stator channel 38 and stator channel plate generally horseshoe shaped fluid flow stator channel 40. The fluid outlet 16 extends from the outlets 46 of both stator channel plate generally horseshoe shaped fluid flow stator channel 38 and stator channel plate generally horseshoe shaped fluid flow stator channel 40.

The fluid flow stator channels are best illustrated in FIG. 8 which is a perspective view of the stator channel plate 33. The generally horseshoe shaped stator channel 40 is shown along with inlet 45 and outlet 46. The inlet 45 and outlet 46 for a single stage helical flow compressor/turbine would normally be relatively displaced approximately thirty (30) degrees. An alignment or locator hole 47 is provided in each of the stator channel plates 32 and 33 and the stripper plate 26. The inlet 45 is connected to the generally horseshoe shaped stator channel 40 by a converging nozzle passage 41 that converts fluid pressure energy into fluid velocity energy. Likewise, the other end of the generally horseshoe shaped stator channel 40 is connected to the outlet 46 by a diverging diffuser passage 42 that converts fluid velocity energy into fluid pressure energy.

The depth and cross-sectional flow area of fluid flow stator channel 40 are tapered preferably so that the peripheral flow velocity need not vary as fluid pressure and density vary along the fluid flow stator channel. When compressing, the depth of the fluid flow stator channel 40 decreases from inlet to outlet as the pressure and density increases. Converging nozzle passage 41 and diverging diffuser passage 42 allow efficient conversion of fluid pressure energy into fluid velocity energy and vice versa.

In a helical flow compressor/turbine, fluid enters the inlet port 12, is accelerated as it passes through the converging nozzle passage 41, is split into two (2) flow paths by stripper plate 26, then enters the end of a generally horseshoe shaped fluid flow stator channel axially adjacent to the impeller blades 48. The fluid is then directed radially inward to the root of the impeller blades 48 by a pressure gradient, accelerated through and out of the blades 48 by centrifigal force, from where it reenters the fluid flow stator channel.

During this time the fluid has been traveling tangentially around the periphery of the helical flow compressor/turbine. As a result of this, a helical flow is established as best shown in FIGS. 6, 9, and 10.

The impeller blades or buckets are best illustrated in FIGS. 6 and 7. The radial outward edge of the impeller 23 includes a plurality of low pressure blades 48. While these blades 48 may be radially straight as shown in FIG. 7, there may be specific applications and/or operating conditions where curved blades may be more appropriate or required.

FIG. 7 illustrates a portion of a helical flow compressor/turbine impeller having a plurality of curved blades 50. The curved blade base or root 51 has less of a curve than the leading edge 52 thereof The curved blade tip 53, at both the root 51 and leading edge 52 would be generally radial.

FIG. 9 shows the flow through the impeller blades and the fluid flow stator channels by means of streamlines 43. On the other hand FIG. 10 schematically illustrates the helical flow around the centerline of the impeller and fluid flow stator channel. The turning of the flow is illustrated by the alternating solid and open flow pattern lines in FIG. 10.

A two (2) stage helical flow compressor/turbine permanent magnet motor/generator 55 is illustrated in FIGS. 11–13 and includes a fluid inlet 56 to provide fluid to the helical flow compressor/turbine 57 of the helical flow compressor/turbine permanent magnet motor/generator 55 and a fluid outlet 58 to remove fluid from the helical flow compressor/turbine 57 of the helical flow compressor/turbine permanent motor/generator 55.

The helical flow compressor/turbine permanent magnet motor/generator 55 includes a shaft 60 rotatably supported by bearings 61 and 62. The position of bearing 62 is maintained by two (2) back-to-back Belleville type washers 65 which also prevent rotation of the outer bearing race. Low pressure stage impeller 63 and high pressure stage impeller 64 are mounted at one end of the shaft 60, while permanent magnet rotor 67 is mounted at the opposite end thereof between bearings 61 and 62. The bearing 61 is held by bearing retainer 68 while bearing 62 is held by bearing retainer 69. A bore seal tube 70 extends between bearing retainer 68 and bearing retainer 69. An O-ring or gasket 71 may be provided in each of the bearing retainers 68 and 69 at both ends of the bore seal tube 70.

Low pressure stripper plate 76 and high pressure stripper plate 77 are disposed radially outward from low pressure impeller 63 and high pressure impeller 64, respectively. The permanent magnet rotor 67 on the shaft 60 is disposed to rotate within stator 66 having electrical conductors which is disposed in the permanent magnet housing 59.

The low pressure impeller 63 is disposed to rotate between the low pressure stator channel plate 72 and the mid stator channel plate 73 while the high pressure impeller 64 is disposed to rotate between the mid stator channel plate 73 and the high pressure stator channel plate 74. Low pressure stripper plate 76 has a thickness slightly greater than the thickness of low pressure impeller 63 to provide a running clearance for the low pressure impeller 63 between low pressure stator channel plate 72 and mid stator channel plate 73 while high pressure stripper plate 77 has a thickness slightly greater than the thickness of high pressure impeller 64 to provide a running clearance for the high pressure impeller 64 between mid stator channel plate 73 and high pressure stator channel plate 74.

The low pressure stator channel plate 72 includes a generally horseshoe shaped fluid flow stator channel 78 having an inlet to receive fluid from the fluid inlet 56. The mid stator channel plate 73 includes a low pressure generally horseshoe shaped fluid flow stator channel 80 on the low pressure side thereof and a high pressure generally horseshoe shaped fluid flow stator channel 81 on the high pressure side thereof The low pressure generally horseshoe shaped fluid flow stator channel 80 on the low pressure side of the mid stator channel plate 73 mirrors the generally horseshoe shaped fluid flow stator channel 78 in the low pressure stator channel plate 72. The high pressure stator channel plate 74 includes a generally horseshoe shaped fluid flow stator channel 82 which mirrors the high pressure generally horseshoe shaped fluid flow stator channel 81 on the high pressure side of mid stator channel plate 73.

Each of the stator channels include an inlet and an outlet disposed radially outward from the channel. The inlets and outlets of the low pressure stator channel plate generally horseshoe shaped fluid flow stator channel 78 and mid helical flow stator channel plate low pressure generally horseshoe shaped fluid flow stator channel 80 are axially aligned as are the inlets and outlets of mid helical flow stator channel plate high pressure generally horseshoe shaped fluid flow stator channel 81 and high pressure stator channel plate generally horseshoe shaped fluid flow stator channel 82.

The fluid inlet 56 extends through both the low pressure stator channel plate 72 and low pressure stripper plate 76 to the inlets of both of low pressure stator channel plate generally horseshoe shaped fluid flow stator channel 78 and mid helical flow stator channel plate low pressure generally horseshoe shaped fluid flow stator channel 80. The fluid outlet 58 extends from the outlets of both the mid helical flow stator channel plate high pressure generally horseshoe shaped fluid flow stator channel 81 and high pressure stator channel plate generally horseshoe shaped fluid flow stator channel 82 through the high pressure stator channel plate 74, through the high pressure stripper plate 77, through the mid stator channel plate 73, through the low pressure stripper plate 76, and finally through the low pressure stator channel plate 72.

The crossover from the low pressure compression stage to the high pressure compression stage is illustrated in FIG. 14. Both of the outlets from the low pressure stator channel plate generally horseshoe shaped fluid flow stator channel 78 and mid helical flow stator channel plate low pressure generally horseshoe shaped fluid flow stator channel 80 provide partially compressed fluid to the crossover 88 which in turn provides the partially compressed fluid to both inlets of mid helical flow stator channel plate high pressure generally horseshoe shaped fluid flow stator channel 81 and high pressure stator channel plate generally horseshoe shaped fluid flow stator channel 82.

The fluid flow stator channels are best illustrated in FIG. 15 which shows the mid stator channel plate 73. The generally horseshoe shaped stator channel 80 is shown along with inlet 85 and outlet 86. The inlet 85 and outlet 86 would normally be displaced approximately thirty (30) degrees. Outlet 86 connects with crossover 85. An alignment or locator hole 87 is provided in each of the low pressure stator channel plate 72, the mid stator channel plate 73 and the high pressure stator channel plate 74 as well as stripper plates 76 and 77.

A three (3) stage helical flow compressor/turbine permanent magnet motor/generator is illustrated in FIG. 16 and is in all respects similar to the two (2) stage machine except for the addition of a third impeller and items associated with the third impeller.

The three (3) stage helical flow compressor/turbine permanent magnet motor/generator includes low pressure stage impeller 90, medium pressure stage impeller 91, and high pressure stage impeller 92 all mounted at one end of the shaft 93, while permanent magnet rotor 94 is mounted at the opposite end thereof.

Low pressure stripper plate 95, medium pressure stripper plate 96, and high pressure stripper plate 97 are disposed radially outward from low pressure impeller 90, medium pressure impeller 91, and high pressure impeller 92, respectively. The permanent magnet rotor 94 on the shaft 93 is disposed to rotate within stator 98 which is disposed in the permanent magnet housing 99.

The low pressure impeller 90 is disposed to rotate between the low pressure stator channel plate 100 and the first mid stator channel plate 101; the medium pressure impeller 91 is disposed to rotate between the first mid pressure stator channel plate 101 and the second mid pressure stator channel plate 102; while the high pressure impeller 92 is disposed to rotate between the second mid stator channel plate 102 and the high pressure stator channel plate 103. Low pressure stripper plate 95 has a thickness slightly greater than the thickness of low pressure impeller 90 to provide a running clearance for the low pressure impeller 90 between low pressure stator channel plate 100 and the first mid stator channel plate 101; medium pressure stripper plate 96 has a thickness slightly greater than the thickness of medium pressure impeller 91 to provide a running clearance for the medium pressure impeller 91 between the first mid stator channel plate 101 and the second mid stator channel plate 102; while high pressure stripper plate 97 has a thickness slightly greater than the thickness of high pressure impeller 92 to provide a running clearance for the high pressure impeller 92 between the second mid stator channel plate 102 and high pressure stator channel plate 103.

Generally horseshoe shaped fluid flow stator channels are disposed on either side of the low pressure impeller 90, the medium pressure impeller 91, and the high pressure impeller 92. Each of the fluid flow stator channels include an inlet and an outlet disposed radially outward from the channel.

The crossover from the low pressure compression stage to the medium pressure stage and from the medium pressure compression stage to the high pressure compression stage would be as described with respect to the crossover between the low pressure stage to the high pressure stage in the two (2) stage helical flow compressor/turbine permanent magnet motor/generator.

FIG. 17 illustrates graphically the pressure rise in psig across a helical flow compressor versus fluid flow rate throughout the compressor for a constant impeller speed. A dashed straight line is provided to demonstrate the curve or slope of this pressure rise.

One particular application to which the helical flow compressor/turbine permanent magnet motor/generator is particularly well suited is to provide gaseous fuel to a turbogenerator. In order to start the turbogenerator, the helical flow compressor/turbine permanent magnet motor/generator would need to be run backwards as a turbine in order to reduce the upstream pressure of the gaseous fuel (typically supplied from a natural gas pipeline). The gaseous fuel header pressure has to be extremely low for ignition.

As the turbogenerator speed increases, the turbogenerator's compressor discharge pressure will increase and the gaseous fuel pressure in the header that feeds the combustor nozzle injectors needs to be maintained above the turbogenerator compressor discharge pressure. For example, if a natural gas pipeline pressure is twenty (20) psi gauge when you want to light-off the turbogenerator, the natural gas pressure will have to be reduced by about nineteen (19) psi when the turbogenerator is turning at low ignition speed. As the turbogenerator speed increases after ignition, the pressure that goes into the header can be increased, that is the pressure needs to be reduced less. Ignition typically will occur while the helical flow compressor/turbine motor/generator is still turning backwards and reducing pressure.

In natural gas applications such as described above, the bore seal tube provides a secondary safety seal to prevent natural gas from contacting the permanent magnet stator and thus any potential arcing therein and also reduces the volume of natural gas passing through the bearings (that is carrying dust contamination to the bearing grease) each time the natural gas pressure varies.

While specific embodiments of the invention have been illustrated and described, it is to be understood that these are provided by way of example only and that the invention is not to be construed as being limited thereto but only by the proper scope of the following claims.

What we claim is:

1. A rotary machine including a helical flow compressor/turbine and a permanent magnet motor/generator comprising:

a housing including a stator positioned at one end of said housing;

a shaft rotatably supported within said housing;

a permanent magnet rotor mounted on said shaft at said one end thereof and operably associated with said stator; and an impeller mounted at the other end of said shaft, said impeller having at least one row of a plurality of curved blades having a generally radial blade tip, said curved impeller blades having a leading edge with a greater curve than the curve of the blade root, said housing including a generally horseshoe shaped fluid flow stator channel operably associated with each row of the plurality of impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said impeller blades.

2. A rotary machine including a helical flow compressor/turbine and a permanent magnet motor/generator comprising:

a housing including a stator having electrical conductors positioned at one end of said housing;

a shaft rotatably supported within said housing;

a permanent magnet rotor mounted on said shaft at said one end thereof and operably associated with said stator having electrical conductors; and an impeller mounted at the other end of said shaft, said impeller having two rows each of a plurality of curved blades having a generally radial blade tip, with one row of said plurality of curved blades disposed on either side of the outer periphery of said impeller, said curved impeller blades having a leading edge with a greater curve than the curve of the blade root, said housing including two generally horseshoe shaped fluid flow stator channels with one of said two generally horseshoe shaped fluid flow stator channels operably associated with one of said two rows of impeller blades and the other of said two generally horseshoe shaped fluid flow stator channels associated with the other of said two rows of impeller blades, said housing also including a stripper plate disposed radially outward from said impeller, a fluid inlet at one end of each of said two generally horseshoe shaped fluid flow stator channels, and a fluid outlet at the other end of each of said two generally horseshoe shaped fluid flow stator channels, the fluid in each of said generally horseshoe shaped fluid flow stator channels proceeding from its fluid inlet to its fluid outlet while following a generally helical flow path with multiple passes through said impeller blades associated with said generally horseshoe shaped fluid flow stator channel.

3. The rotary machine of claim 2 wherein said stripper plate has a thickness slightly greater than the thickness of said impeller to provide a running clearance for said impeller.

4. The rotary machine of claim 2 and in addition, a bore seal tube disposed between said stator and said permanent magnet rotor to prevent the working fluid from contacting said stator.

5. The rotary machine of claim 2 wherein said generally horseshoe shaped fluid flow stator channels have a depth which decreases from said fluid inlet to said fluid outlet.

6. The rotary machine of claim 2 wherein said generally horseshoe shaped fluid flow stator channels are connected to said fluid inlets by a converging nozzle passage.

7. The rotary machine of claim 2 wherein said generally horseshoe shaped fluid flow stator channels are connected to said fluid outlets by a diverging diffuser passage.

8. The rotary machine of claim 2 wherein said generally horseshoe shaped fluid flow stator channels are connected to said fluid inlets by a converging nozzle passage and to fluid outlets by a diverging diffuser passage.

9. A rotary machine including a helical flow compressor/turbine and a permanent magnet motor/generator comprising:
   a housing including a stator having electrical conductors positioned at one end of said housing;
   a shaft rotatably supported within said housing;
   a permanent magnet rotor mounted on said shaft at said one end thereof and operably associated with said stator having electrical conductors;
   a low pressure impeller mounted at the other end of said shaft, said low pressure impeller having two rows each of a plurality of curved blades, with one row of said plurality of curved blades disposed on either side of the outer periphery of said impeller;
   a high pressure impeller mounted at the other end of said shaft, said high pressure impeller having two rows each of a plurality of curved blades, with one row of said plurality of curved blades disposed on either side of the outer periphery of said high pressure impeller;
   said low pressure and said high pressure curved impeller blades having a generally radial blade tip and a leading edge with a greater curve than the curve of the blade root;
   said housing including a low pressure stator channel plate disposed on one side of said low pressure impeller, a mid stator channel plate disposed between said low pressure impeller and said high pressure impeller and a high pressure stator channel plate disposed on the other side of said high pressure impeller, said low pressure stator channel plate having a generally horseshoe shaped fluid flow stator channel operably associated with one of said two rows of low pressure impeller blades, said mid stator channel plate having a generally horseshoe shaped fluid flow stator channel operably associated with the other of said two rows of low pressure impeller blades and a generally horseshoe shaped fluid flow stator channel operably associated with one of said two rows of high pressure impeller blades and said high pressure stator channel plate having a generally horseshoe shaped fluid flow stator channel operably associated with the other of said two rows of high pressure impeller blades, said mid stator channel plate generally horseshoe shaped fluid flow stator channel facing said low pressure impeller mirroring said low pressure stator channel plate generally horseshoe shaped fluid flow stator channel and said mid stator channel plate generally horseshoe shaped fluid flow stator channel facing said high pressure impeller mirroring said high pressure stator channel plate generally horseshoe shaped fluid flow stator channel, said housing also including a low pressure stripper plate disposed radially outward of said low pressure impeller between said low pressure stator channel plate and said mid stator channel plate and a high pressure stripper plate disposed radially outward of said high pressure impeller between said mid stator channel plate and said high pressure stator channel plate, said low pressure stripper plate having a slightly greater thickness than said low pressure impeller to provide rotational clearance for said low pressure impeller between said low pressure stator channel plate and said mid stator channel plate, and said high pressure stripper plate having a slightly greater thickness than said high pressure impeller to provide rotational clearance for said high pressure impeller between said mid stator channel plate and said high pressure stator channel plate, said housing further including a fluid inlet at one end of each of said generally horseshoe shaped fluid flow stator channels, and a fluid outlet at the other end of each of said generally horseshoe shaped fluid flow stator channels, said inlets of said high pressure generally horseshoe shaped fluid flow stator channels communicating with the outlets of said low pressure generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

10. A helical flow compressor permanent magnet motor/generator comprising:
   a housing;
   a stator having electrical conductors mounted within said housing at one end of said housing;
   a shaft rotatably supported within said housing by a pair of journal bearings;
   a permanent magnet rotor mounted on said shaft between said pair of journal bearings, said permanent magnet rotor disposed on said shaft to rotate within said stator having electrical conductors mounted at one end of said housing;
   a low pressure impeller mounted at the other end of said shaft, said low pressure impeller having two rows each of a plurality of curved blades, with one row of said plurality of curved blades disposed on either side of the outer periphery of said low pressure impeller;
   a medium pressure impeller mounted at the other end of said shaft adjacent to said low pressure impeller, said medium pressure impeller having two rows each of a plurality of curved blades, with one row of said plurality of curved blades disposed on either side of the outer periphery of said medium pressure impeller;

a high pressure impeller mounted at the other end of said shaft adjacent to said medium pressure impeller, said high pressure impeller having two rows each of a plurality of curved blades, with one row of said plurality of curved blades disposed on either side of the outer periphery of said high pressure impeller;

said low pressure, said medium pressure, and said high pressure curved impeller blades having a generally radial blade tip and a leading edge with a greater curve than the curve of the blade root;

said housing including a first mid stator channel plate disposed between said low pressure impeller and said medium pressure impeller, a first pair of generally horseshoe shaped fluid flow stator channels with one of said first pair of generally horseshoe shaped fluid flow stator channels operably associated with one of said two rows of low pressure impeller curved blades and the other of said first pair of generally horseshoe shaped fluid flow stator channels operably associated with the other of said two rows of low pressure impeller curved blades, and a second pair of generally horseshoe shaped fluid flow stator channels with one of said second pair of generally horseshoe shaped fluid flow stator channels operably associated with one of said two rows of medium pressure impeller curved blades and the other of said second pair of generally horseshoe shaped fluid flow stator channels operably associated with the other of said two rows of medium pressure impeller curved blades, said housing also including a second mid stator channel plate disposed between said medium pressure impeller and said high pressure impeller and a third pair of generally horseshoe shaped fluid flow stator channels with one of said third pair of generally horseshoe shaped fluid flow stator channels operably associated with one of said two rows of high pressure impeller curved blades and the other of said first pair of generally horseshoe shaped fluid flow stator channels operably associated with the other of said two rows of high pressure impeller curved blades, said housing further including a low pressure stripper plate disposed radially outward of said low pressure impeller, a medium pressure stripper plate disposed radially outward of said medium pressure impeller, a high pressure stripper plate disposed radially outward of said high pressure impeller, a fluid inlet at one end of each of said first pair of generally horseshoe shaped fluid flow stator channels, and a fluid outlet at the other end of said first pair of said generally horseshoe shaped fluid flow stator channels, a fluid inlet at one end of each of said second pair of generally horseshoe shaped fluid flow stator channels and a fluid outlet at the other end of said second pair of said generally horseshoe shaped fluid flow stator channels, and a fluid inlet at one end of each of said third pair of generally horseshoe shaped fluid flow stator channels and a fluid outlet at the other end of said third pair of said generally horseshoe shaped fluid flow stator channels, said inlet of said second pair of said generally horseshoe shaped fluid flow stator channels communicating with the outlet of said first pair of said generally horseshoe shaped fluid flow stator channels, and said inlet of said third pair of said generally horseshoe shaped fluid flow stator channels communicating with the outlet of said second pair of said generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

11. A rotary machine comprising:

a permanent magnet motor/generator comprising a housing, a shaft rotatable supported within said housing on a pair of bearings, a permanent magnet rotor disposed on said shaft between said bearings, and a wound stator disposed within said housing around said permanent magnet rotor, said shaft having a free end extending out from said permanent magnet motor/generator housing; and a helical flow compressor/turbine operably associated with said permanent magnet motor/generator and comprising at least one impeller disposed on the free end of said permanent magnet motor/generator shaft and having at least one row of a plurality of curved blades at the outer periphery of said impeller, said curved impeller blades having a generally radial blade tip and a leading edge with a greater curve than the curve of the blade root, and a helical flow compressor/turbine housing disposed around said at least one impeller and removably connected to said permanent magnet motor/generator housing, said helical flow compressor/turbine housing including a stripper plate disposed radially outward of each of said at least one impeller and a generally horseshoe shaped fluid flow stator channel operably associated with each row of said plurality of impeller blades, a fluid inlet at one end of each of said generally horseshoe shaped fluid flow stator channels, and a fluid outlet at the other end of each of said generally horseshoe shaped fluid flow stator channels, the fluid in said generally horseshoe shaped fluid flow stator channels proceeding from said fluid inlet to said fluid outlet while following a generally helical flow path with multiple passes through said impeller blades.

12. The rotary machine of claim 11 wherein said stripper plates have a thickness slightly greater than the thickness of said corresponding impeller to provide a running clearance for said impeller.

13. The rotary machine of claim 11 and in addition, a bore seal tube disposed between said stator and said permanent magnet rotor to prevent the working fluid from contacting said stator.

14. The rotary machine of claim 11 wherein said rotary machine can generate electrical power from the working fluid when the fluid pressure supplied to the inlet of the rotary machine is greater than the fluid pressure needed at the outlet of the rotary machine and can utilize electrical power to compress or pressurize the working fluid when the fluid pressure needed at the outlet of the rotary machine is greater than the fluid pressure supplied at the inlet of the rotary machine.

15. The rotary machine of claim 11 wherein said rotary machine includes a converging nozzle passage at the entry to each generally horseshoe shaped fluid flow stator channel.

16. The rotary machine of claim 11 wherein said rotary machine includes a diverging diffuser passage at the exit from each generally horseshoe shaped fluid flow stator channel.

17. The rotary machine of claim 11 wherein said stripper plates split the inlet flow entering each generally horseshoe shaped fluid flow stator channel into two radial flow paths, one flow path on each axial side of the impeller wheel to initiate the helical fluid flow pattern.

18. A rotary machine including a helical flow compressor/turbine and a permanent magnet motor/generator comprising:

a housing including a wound stator positioned at one end of said housing;

a shaft rotatably supported within said housing;

a permanent magnet rotor mounted on said shaft at said one end thereof and operably associated with said wound stator; and an impeller mounted at the other end of said shaft, said impeller having two rows each of a plurality of curved blades, with one row of said plurality of curved blades disposed on either side of the outer periphery of said impeller, said curved impeller blades having a leading edge with a greater curve than the curve of the blade root, said housing including two generally horseshoe shaped fluid flow stator channels with one of said two generally horseshoe shaped fluid flow stator channels operably associated with one of said two rows of impeller blades and the other of said two generally horseshoe shaped fluid flow stator channels associated with the other of said two rows of impeller blades, said housing also including a stripper plate disposed radially outward from said impeller, a fluid inlet at one end of each of said two generally horseshoe shaped fluid flow stator channels, and a fluid outlet at the other end of each of said two generally horseshoe shaped fluid flow stator channels, the fluid in each of said generally horseshoe shaped fluid flow stator channels proceeding from its fluid inlet to its fluid outlet while following a generally helical flow path with multiple passes through said impeller blades associated with said generally horseshoe shaped fluid flow stator channel.

19. A rotary machine including a helical flow compressor/turbine and a permanent magnet motor/generator comprising:

a housing including a stator having electrical conductors positioned at one end of said housing;

a shaft rotatably supported within said housing;

a permanent magnet rotor mounted on said shaft at said one end thereof and operably associated with said stator having electrical conductors;

a low pressure impeller mounted at the other end of said shaft, said low pressure impeller having two rows each of a plurality of curved blades, with one row of said plurality of curved blades disposed on either side of the outer periphery of said impeller;

a high pressure impeller mounted at the other end of said shaft, said high pressure impeller having two rows each of a plurality of curved blades, with one row of said plurality of curved blades disposed on either side of the outer periphery of said high pressure impeller;

said low pressure and said high pressure curved impeller blades having a generally radial blade tip and a leading edge with a greater curve than the curve of the blade root;

said housing including a mid stator channel plate disposed between said low pressure impeller and said high pressure impeller, a first pair of generally horseshoe shaped fluid flow stator channels with one of said first pair of generally horseshoe shaped fluid flow stator channels operably associated with one of said two rows of low pressure impeller blades and the other of said first pair of generally horseshoe shaped fluid flow stator channels operably associated with the other of said two rows of low pressure impeller blades, and a second pair generally horseshoe shaped fluid flow stator channels with one of said second pair of generally horseshoe shaped fluid flow stator channels operably associated with one of said two rows of high pressure impeller blades and the other of said second pair of generally horseshoe shaped fluid flow stator channels operably associated with the other of said two rows of high pressure impeller blades, said housing also including a low pressure strip plate disposed radially outward of said low pressure impeller and a high pressure stripper plate disposed radially outward of said high pressure impeller, said low pressure stripper plate having a slightly greater thickness than said low pressure impeller and said high pressure stripper plate having a slightly greater thickness than said high pressure impeller, said housing further including a fluid inlet at one end of each of said first pair of generally horseshoe shaped fluid flow stator channels, and a fluid outlet at the other end of said first pair of said generally horseshoe shaped fluid flow stator channels and a fluid inlet at one end of each of said second pair of generally horseshoe shaped fluid flow stator channels and a fluid outlet at the other end of each of said second pair of said generally horseshoe shaped fluid flow stator channels, said inlet of said second pair of said generally horseshoe shaped fluid flow stator channels communicating with the outlet of said first pair of said generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

20. The rotating machine of claim 18 and in addition, a bore seal tube disposed between said wound stator and said permanent magnet rotor to prevent the working fluid from contacting said wound stator.

21. The rotary machine of claim 18 wherein said generally horseshoe shaped fluid flow stator channels have a depth which decreases from said fluid inlet to said fluid outlet.

22. The rotary machine of claim 18 wherein said generally horseshoe shaped fluid flow stator channels are connected to said fluid inlets by a converging nozzle passage.

23. The rotary machine of claim 18 wherein said generally horseshoe shaped fluid flow stator channels are connected to said fluid outlets by a diverging diffuser passage.

24. The rotary machine of claim 18 wherein said generally horseshoe shaped fluid flow stator channels are connected to said fluid inlets by a converging nozzle passage and to fluid outlets by a diverging diffuser passage.

25. A rotary machine including a helical flow compressor/turbine and a permanent magnet motor/generator comprising:

a housing including a wound stator positioned at one end of said housing;

a shaft rotatably supported within said housing;

a permanent magnet rotor mounted on said shaft at said one end thereof and operably associated with said wound stator;

a low pressure impeller mounted at the other end of said shaft, said low pressure impeller having two rows each of a plurality of curved blades having a leading edge with a greater curve than the curve of the blade root, with one row of said plurality of curved blades disposed on either side of the outer periphery of said impeller;

a high pressure impeller mounted at the other end of said shaft, said high pressure impeller having two rows each of a plurality of curved blades having a leading edge with a greater curve than the curve of the blade root, with one row of said plurality of curved blades disposed on either side of the outer periphery of said high pressure impeller;

said housing including a low pressure stator channel plate disposed on one side of said low pressure impeller, a mid stator channel plate disposed between said low pressure impeller and said high pressure impeller, and a high pressure stator channel plate disposed on the other side of said high pressure impeller, said low pressure stator channel plate having a generally horseshoe shaped fluid flow stator channel operably associated with one of said two rows of low pressure impeller blades, said mid stator channel plate having a generally horseshoe shaped fluid flow stator channel associated with the other of said two rows of low pressure impeller blades and a generally horseshoe shaped fluid flow stator channel operably associated with one of said two rows of high pressure impeller blades, and said high pressure stator channel plate having a generally horseshoe shaped fluid flow stator channel operably associated with the other of said two rows of high pressure impeller blades, said mid stator channel plate generally horseshoe shaped fluid flow stator channel facing said low pressure impeller mirroring said low pressure stator channel plate generally horseshoe shaped fluid flow stator channel and said mid stator channel plate generally horseshoe shaped fluid flow stator channel facing said high pressure impeller mirroring said high pressure stator channel plate generally horseshoe shaped fluid flow stator channel, said housing also including a low pressure stripper plate disposed radially outward of said low pressure impeller between said low pressure stator channel plate and said mid stator channel plate and a high pressure stripper plate disposed radially outward of said high pressure impeller between said mid stator channel plate and said high pressure stator channel plate, said low pressure stripper plate having a slightly greater thickness than said low pressure impeller to provide rotational clearance for said low pressure impeller between said low pressure stator channel plate and said mid stator channel plate, and said high pressure stripper plate having a slightly greater thickness than said high pressure impeller to provide rotational clearance for said high pressure impeller between said mid stator channel plate and said high pressure stator channel plate, said housing further including a fluid inlet at one end of each of said generally horseshoe shaped fluid flow stator channels, and a fluid outlet at the other end of each of said generally horseshoe shaped fluid flow stator channels, said inlets of said high pressure generally horseshoe shaped fluid flow stator channels communicating with the outlets of said low pressure generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

* * * * *

UNITED STATES PATENT AND TRADEMARK OFFICE
CERTIFICATE OF CORRECTION

PATENT NO : 5,899,673
DATED : May 4, 1999
INVENTOR(S) : Robert W. Bosley et al.

It is certified that error appears in the above-identified patent and that said Letters Patent is hereby corrected as shown below:

Column 5, line 63, change "fill" to --full--
Column 9, line 14, after "thereof" insert --.--
Column 10, line 5, after "thereof" insert --.--
Column 12, line 10, delete "permanent magnet"
Claim 9, line 27, after "impeller" (second occurrence) insert --,--
Claim 9, line 39, after "blades" insert --,--
Claim 19, line 42, change "strip" to --stripper--

Signed and Sealed this

Twenty-first Day of September, 1999

Attest:

Q. TODD DICKINSON

*Attesting Officer*     *Acting Commissioner of Patents and Trademarks*